United States Patent
Nagar et al.

(10) Patent No.: US 12,530,260 B2
(45) Date of Patent: Jan. 20, 2026

(54) CIRCUITS AND METHODS FOR CORRECTING ERRORS IN MEMORY

(71) Applicant: SK Hynix NAND Product Solutions Corp., Rancho Cordova, CA (US)

(72) Inventors: Krishna Nagar, Union City, CA (US); Brandon Gordon, Campbell, CA (US); Yi Peng, Newark, CA (US)

(73) Assignee: SK Hynix NAND Product Solutions Corp., Rancho Cordova, CA (US)

( * ) Notice: Subject to any disclaimer, the term of this patent is extended or adjusted under 35 U.S.C. 154(b) by 894 days.

(21) Appl. No.: 17/525,917

(22) Filed: Nov. 14, 2021

(65) Prior Publication Data
US 2022/0075688 A1     Mar. 10, 2022

(51) Int. Cl.
*G06F 11/10*     (2006.01)
*G06F 3/06*     (2006.01)

(52) U.S. Cl.
CPC ........ *G06F 11/1068* (2013.01); *G06F 3/0619* (2013.01); *G06F 3/0659* (2013.01); *G06F 3/0673* (2013.01)

(58) Field of Classification Search
CPC .. G06F 11/1068; G06F 3/0619; G06F 3/0659; G06F 3/0673; G06F 11/1048; G06F 11/106
See application file for complete search history.

(56) References Cited

U.S. PATENT DOCUMENTS

| | | | |
|---|---|---|---|
| 5,864,568 A * | 1/1999 | Nemazie | G06F 3/0613 710/56 |
| 7,043,679 B1 | 5/2006 | Keltcher et al. | |
| 7,089,461 B2 * | 8/2006 | Gilbert | G06F 11/106 714/48 |
| 7,328,377 B1 | 2/2008 | Lewis et al. | |
| 8,112,678 B1 | 2/2012 | Lewis et al. | |
| 9,934,841 B1 | 4/2018 | Langhammer et al. | |
| 11,429,481 B1 * | 8/2022 | Azad | G06F 12/06 |

(Continued)

FOREIGN PATENT DOCUMENTS

WO     9927449     6/1999

OTHER PUBLICATIONS

European Patent Office, extended European Search Report and European Search Opinion for European patent application 22200254.5 dated Apr. 4, 2023, pp. 1-14.

*Primary Examiner* — Albert Decady
*Assistant Examiner* — Enamul M Kabir
(74) *Attorney, Agent, or Firm* — Haley Guiliano LLP

(57) ABSTRACT

An electronic system includes a processor circuit, a memory circuit, and an error correction circuit. The error correction circuit receives information read from the memory circuit. The error correction circuit detects if the information contains an error. The error correction circuit corrects the error in the information to generate corrected information and provides the corrected information and an error signal to the processor circuit. The processor circuit provides the corrected information and a write command to the memory circuit based on the error signal indicating the error. The memory circuit overwrites the information stored in the memory circuit with the corrected information in response to the write command.

16 Claims, 4 Drawing Sheets

(56) References Cited

U.S. PATENT DOCUMENTS

| | | | |
|---|---|---|---|
| 2009/0292971 A1* | 11/2009 | Man | G11C 7/14 |
| | | | 714/763 |
| 2010/0306620 A1* | 12/2010 | Spraul | G06F 11/1028 |
| | | | 714/E11.034 |
| 2018/0314580 A1* | 11/2018 | Kelly | H03M 13/2906 |
| 2019/0272211 A1* | 9/2019 | Colombo | G06F 11/0727 |
| 2020/0193040 A1* | 6/2020 | Williams | G06F 21/64 |
| 2021/0224155 A1* | 7/2021 | Bains | G06F 11/1048 |
| 2022/0121516 A1* | 4/2022 | Walker | G06F 9/3861 |

* cited by examiner

CIRCUITS AND METHODS FOR CORRECTING ERRORS IN MEMORY

FIELD OF THE DISCLOSURE

The present disclosure relates to electronic circuits, and more particularly, to circuits and methods for correcting errors in memory.

BACKGROUND

Programmable integrated circuits are a type of integrated circuit that can be programmed by a user to implement desired custom logic functions. In a typical scenario, a logic designer uses computer-aided design tools to design a custom logic circuit. When the design process is complete, the computer-aided design tools generate configuration data. The configuration data is loaded into memory elements on a programmable integrated circuit to configure the programmable integrated circuit to perform the functions of the custom logic circuit. A field-programmable gate array (FPGA) is one type of programmable integrated circuit.

DETAILED DESCRIPTION

Figure 1:
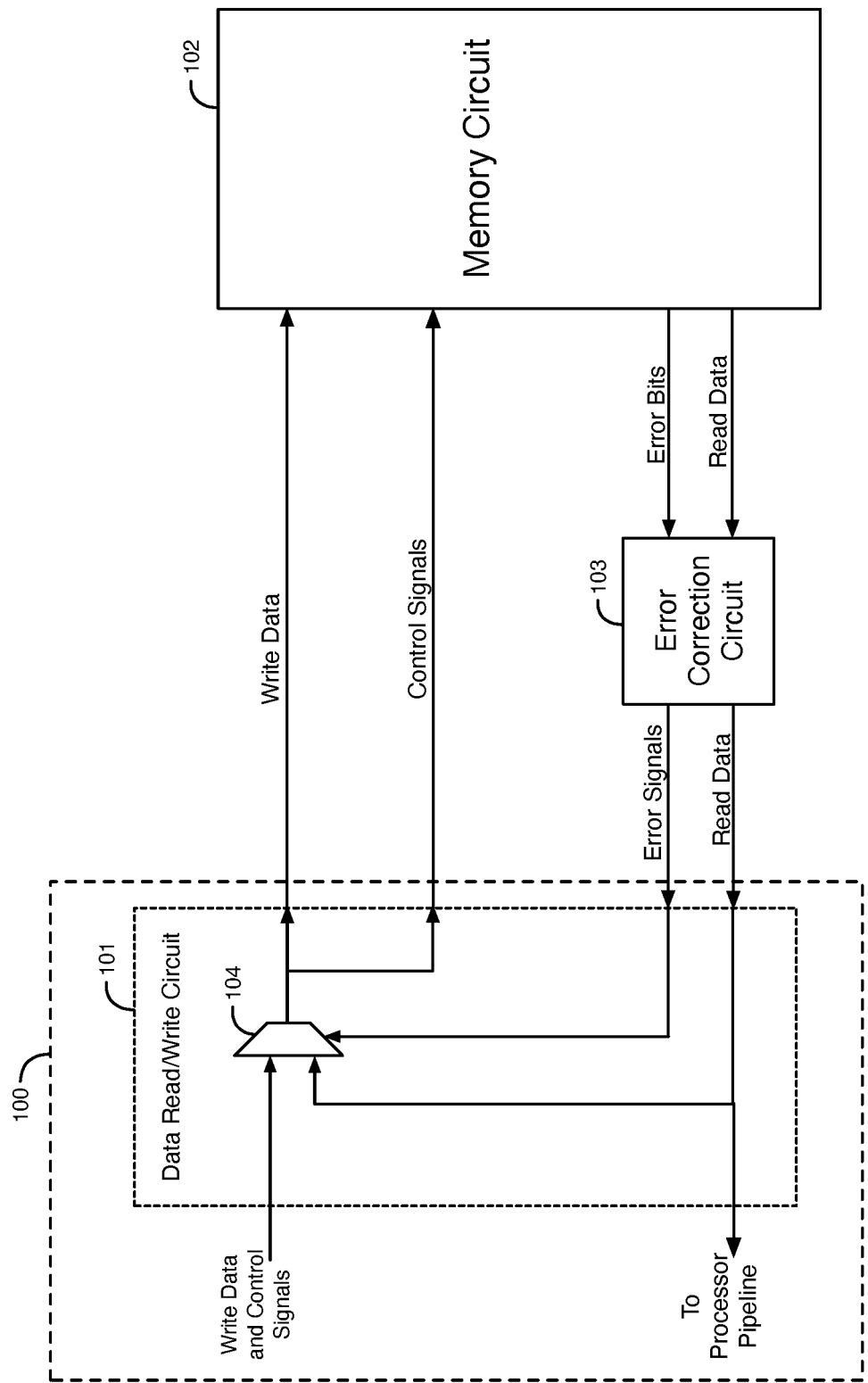
FIG. 1 is a diagram of exemplary electronic circuitry that corrects errors in data stored in a memory circuit.

Many types of integrated circuits, such as field programmable gate arrays (FPGAs), have embedded memory circuits. An embedded memory circuit in an IC may be used in a processor subsystem within the IC for storing instructions and data. Error correction circuitry in the IC may be used to detect and correct errors in data or instructions (e.g., software code) read from the embedded memory circuit. The error corrected data or instructions may be transmitted to a processor circuit in the processor subsystem. However, the error correction circuitry may lack the capability to correct the corrupted data or instructions stored in the embedded memory circuit. Data and/or instructions are also collectively referred to herein as data/instructions, or simply as information. In response to a correctable error in the information accessed from the memory circuit, the processor circuit interrupts the flow of the program that the processor circuit is running to correct the information stored in the embedded memory circuit. The processor circuit flags an access fault exception that is handled in software, and then writes the corrected information back to memory locations in the embedded memory circuit where the corrupted information was accessed.

When an exception is flagged by the processor circuit in response to a correctable error in the information accessed from embedded memory, the current operating context of the processor circuit is saved, the pipeline of the processor circuit is flushed, and exception handling code is fetched to handle the access fault exception. After the exception handling code is completed, the processor circuit restores the saved operating context, and the instructions that are flushed by the exception are re-fetched to return to the program location to where the exception was flagged, which disrupts the program flow and reduces the overall efficiency and reliability of the processor subsystem. The process of saving the operating context, detecting and fixing the cause of the exception, and restoring the operating context may require the execution of several hundreds of extra instructions. This approach adversely affects the performance of the processor circuit and reduces the reliability of the processor subsystem.

According to some examples disclosed herein, read/write circuitry in an integrated circuit (IC) accesses data or instructions (i.e., information) stored in an embedded memory circuit in the IC. Error correction circuitry in the IC detects and corrects any correctable errors in the information read from the embedded memory circuit. The error correction circuitry provides the error corrected information to the read/write circuitry. The read/write circuitry then sends a write command with the received error corrected information to the embedded memory circuit. The embedded memory circuit then stores the error corrected information in the same memory locations that the information having the error was accessed from to overwrite the corrupted information.

The read/write circuitry may, for example, be part of a processor circuit in the IC. The read/write circuitry may send the write command to the embedded memory circuit asynchronously, such that the write command is not associated with any instruction being executed by the processor circuit. The write command may be transparent to the flow of a program being executed by the processor. Control logic in the processor circuit does not raise an exception when the error correction circuitry flags a correctable error in the information read from the embedded memory circuit. The exception handler in the processor circuit is not invoked, and the flow of the program being executed by the processor circuit is not disrupted by any errors in the information read from the embedded memory circuit. If there are instructions in the program being executed by the processor circuit that are accessing the embedded memory circuit immediately after the correctable error is detected, the read/write circuitry prioritizes the error correction over the program instructions and stalls the state of the processor circuit for a short time, e.g., one cycle. In this example, the error correction of the information stored in the embedded memory circuit incurs a minimal amount of circuit area and extra latency.

Throughout the specification, and in the claims, the term "connected" means a direct electrical connection between the circuits that are connected, without any intermediary devices. The term "coupled" means either a direct electrical connection between circuits or an indirect electrical connection through one or more passive or active intermediary devices. The term "circuit" may mean one or more passive and/or active electrical components that are arranged to cooperate with one another to provide a desired function.

FIG. 1 is a diagram of exemplary electronic circuitry that corrects errors in data stored in a memory circuit. The electronic circuitry shown in Figure (FIG. 1 includes a processor circuit 100, a memory circuit 102, and an error correction circuit 103 that are coupled together. The processor circuit 100 includes a data read/write circuit 101. The data read/write circuit 101 includes a multiplexer circuit 104. The electronic circuitry of FIG. 1 may, for example, be in an integrated circuit (IC), the memory circuit 102 and the error correction circuit 103 may be in an embedded memory circuit in the IC, and the processor circuit 100 may be an embedded processor in the IC. The IC may be any type of IC, such as a programmable integrated circuit (IC), a microprocessor, a graphics processing unit, an application specific IC, a memory IC, etc. Programmable ICs include any integrated circuits that may be programmed to perform desired functions, including programmable logic arrays (PLAs), programmable array logic (PAL), field programmable gate arrays (FPGAs), and programmable logic devices (PLDs). Memory circuit 102 may be any type of memory circuit, such as a static random access memory (SRAM), a dynamic RAM (DRAM), or a non-volatile memory circuit. If the IC is a programmable IC, the data read/write circuit 101 and/or the error correction circuit 103 may, for example, be implemented by configuring programmable logic circuits in the IC.

As shown in FIG. 1, Write Data and Control Signals are provided to a first data input of the multiplexer circuit 104 in the data read/write circuit 101 in the processor circuit 100. The Control Signals include a read command or a write command indicating the type of data access transaction, addresses of the memory cells to be accessed in memory circuit 102 by the read or write command, and the size of the Write Data (e.g., number of bytes, words, half-words, etc.) to be written to memory circuit 102 or the size of the Read Data to be read from memory circuit 102. The Write Data and Control Signals may be provided from other circuitry in processor circuit 100 or from other circuitry in the IC. One or more Error signals are provided to select inputs of multiplexer circuit 104 from the error correction circuit 103. In response to the one or more Error signals indicating that the error correction circuit 103 has not detected an error, the multiplexer circuit 104 provides the Write Data and/or the Control Signals to the memory circuit 102, as shown in FIG. 1. If the Control Signals provided to memory circuit 102 include a write command, the memory circuit 102 stores the Write Data received from multiplexer circuit 104 in memory cells in memory circuit 102 having the addresses indicated by the Control Signals in response to the write command.

Figure 2:
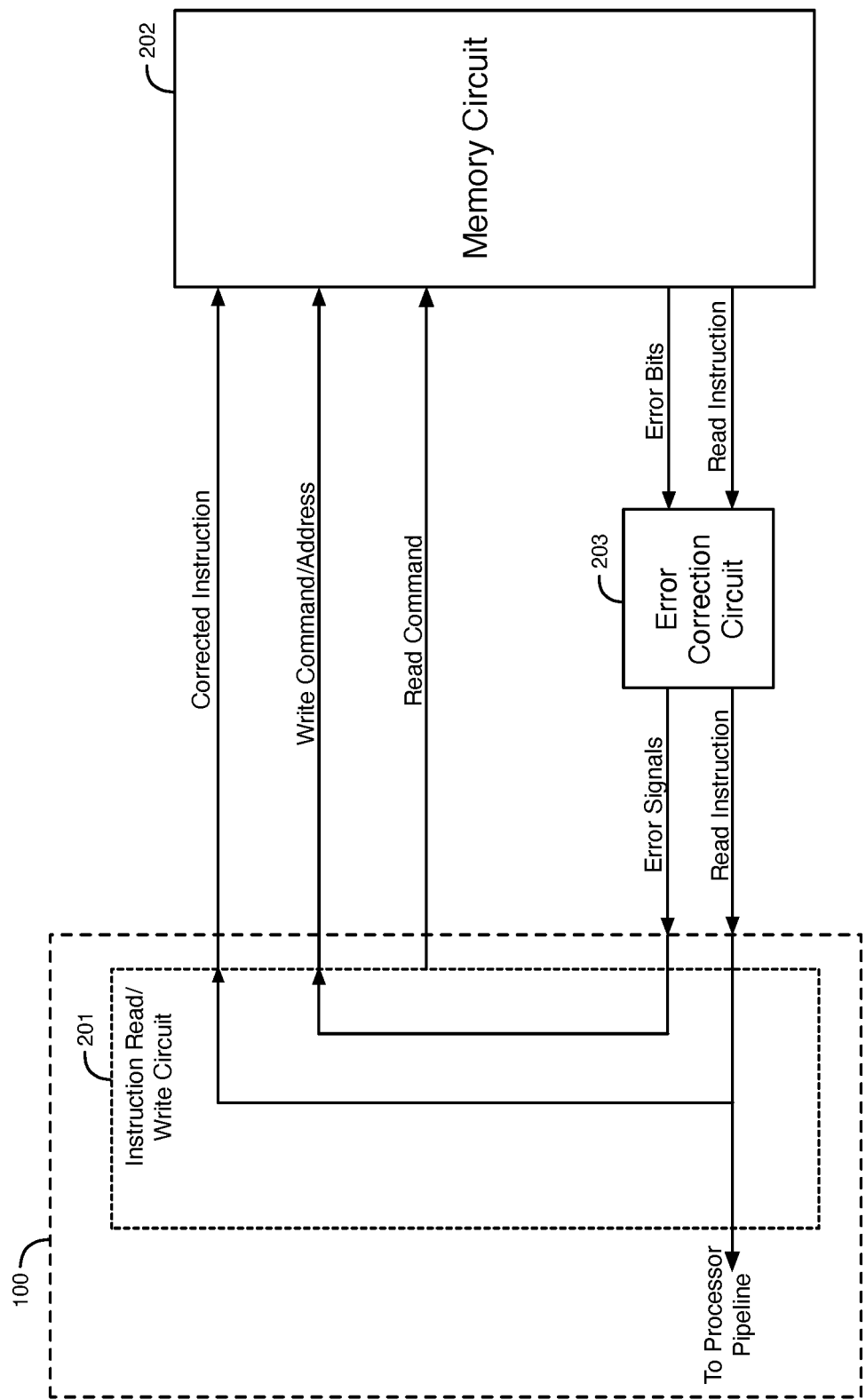
FIG. 2 is a diagram of exemplary electronic circuitry that corrects errors in instructions stored in a memory circuit.

FIG. 2 is a diagram of exemplary electronic circuitry that corrects errors in instructions stored in a memory circuit. In the example of FIG. 2, the instructions may be, for example, software instructions that can be run by processor circuit 100 to implement software functions. The electronic circuitry shown in Figure (FIG. 2 includes processor circuit 100, a memory circuit 202, and an error correction circuit 203 that are coupled together as shown in FIG. 2. Processor circuit 100 includes an instruction read/write circuit 201. The electronic circuitry of FIG. 2 may, for example, be in the same integrated circuit (IC) as the circuitry of FIG. 1. The memory circuit 202 and the error correction circuit 203 may, as an example, be in an embedded memory circuit in the IC. The IC may be any type of IC, such as a programmable integrated circuit (IC), a microprocessor, a graphics processing unit, an application specific IC, a memory IC, etc. Memory circuit 202 may be any type of memory circuit, such as a static random access memory (SRAM), a dynamic RAM (DRAM), or a non-volatile memory circuit. If the IC is a programmable IC, the instruction read/write circuit 201 and/or the error correction circuit 203 may, for example, be implemented by configuring programmable logic circuits in the IC.

Figure 3:
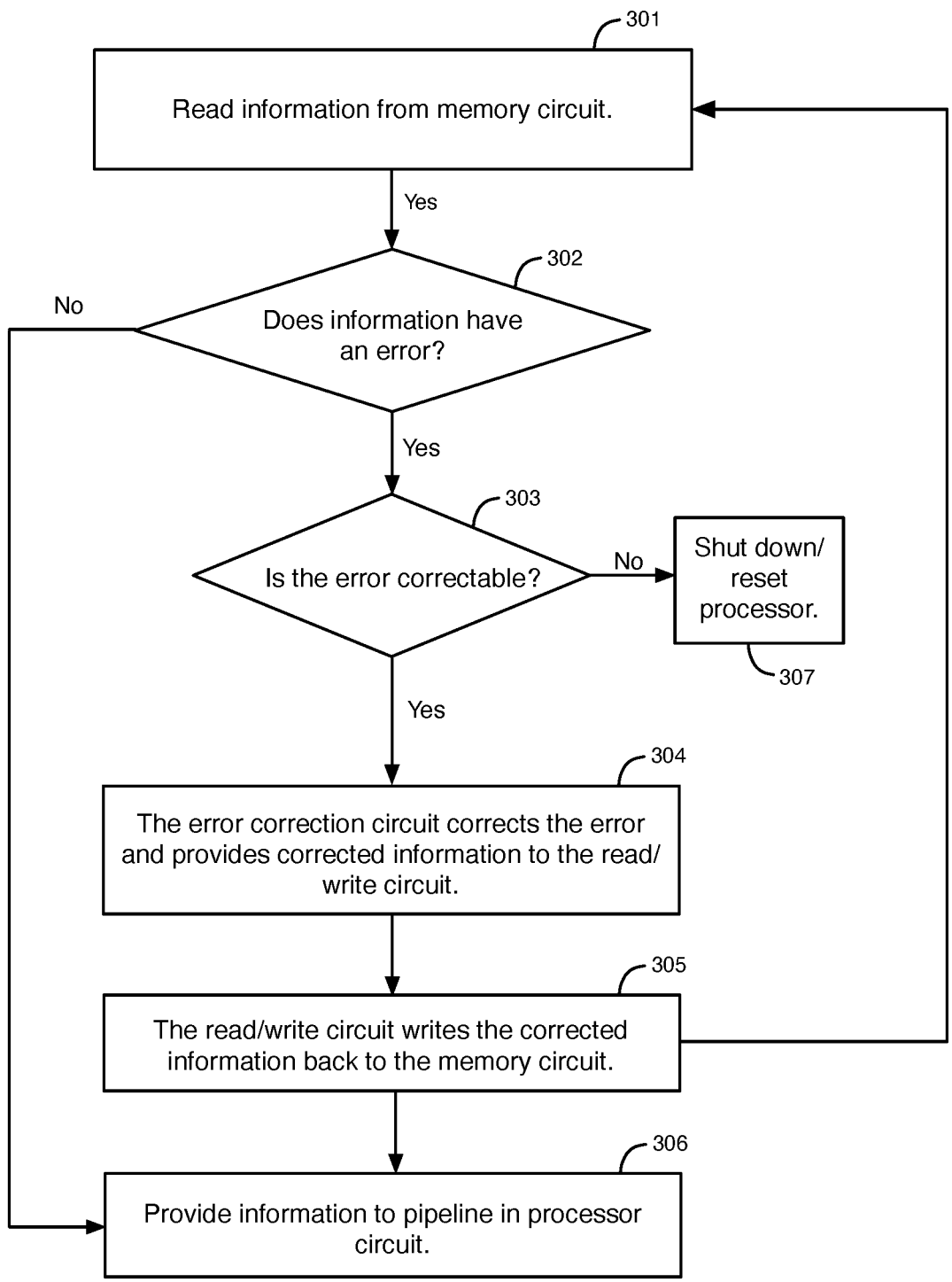
FIG. 3 is a flow chart that illustrates examples of operations that may be performed by the electronic circuitry of FIGS. 1 and 2 to read data or instructions from a memory circuit and to correct any errors in the data or instructions stored in the memory circuit.

FIG. 3 is a flow chart that illustrates examples of operations that may be performed by the electronic circuitry of FIGS. 1 and 2 to read data or instructions from a memory circuit and to correct any errors in the data or instructions stored in the memory circuit. Initially, read/write circuit 101/201 receives a read command from pipeline circuitry in the processor circuit 100 that requests access to data or instructions stored in memory circuit 102/202. Data or instructions are more generally referred to herein as data/instructions or as information. The read/write circuit 101/201 provides the read command to one or more inputs of memory circuit 102/202 in response to the one or more Error signals indicating that the error correction circuit 103/203 has not detected an error. In operation 301, the memory circuit 102/202 reads information from memory cells in the memory circuit 102/202 in response to the read command. The memory circuit 102/202 provides the information read from the memory cells and error bits to error correction circuit 103/203. In the example of FIG. 1, data are read from memory circuit 102 in response to the read command from read/write circuit 101 and provided to error correction circuit 103. Memory circuit 102 also provides error bits that may indicate errors in the data to error correction circuit 103. In the example of FIG. 2, an instruction is read from memory circuit 202 in response to the read command and provided to error correction circuit 203. Memory circuit 202 also provides error bits that may indicate errors in the instruction to error correction circuit 203. The error bits may include any type of error detection and/or error correction bits, for example, parity bits, low density parity check bits, checksum bits, Reed-Solomon codes, cyclic redundancy check codes, Hamming codes, etc.

In operation 302, the error correction circuit 103/203 determines if the information read from memory circuit 102/202 has an error using the error bits. In the example of FIG. 1, the error correction circuit 103 determines if the data read from memory circuit 102 have an error using the error bits received from memory circuit 102. In the example of FIG. 2, the error correction circuit 203 determines if the instruction read from memory circuit 202 has an error using the error bits received from memory circuit 202. If error correction circuit 103/203 determines that the information read from memory circuit 102/202 does not have an error, then the information read from memory circuit 102/202 is provided to the pipeline in processor circuit 100 in operation 306.

If the error correction circuit 103/203 detects an error in the information read from memory circuit 102/202, then error correction circuit 103/203 performs operation 303. In operation 303, the error correction circuit 103/203 determines if the error detected in the information is a correctable error. In the example of FIG. 1, the error correction circuit 103 determines if the error in the data read from memory circuit 102 is correctable. In the example of FIG. 2, the error correction circuit 203 determines if the error in the instruction read from memory circuit 202 is correctable. If the error correction circuit 103/203 determines that the error is not correctable in operation 303, then error correction circuit 103/203 generates a value in the one or more Error signals indicating that an uncorrectable error has occurred and that uncorrectable, erroneous read information appears at the output of error correction circuit 103/203. In response to the Error signals indicating an uncorrectable error, the processor circuit 100 shuts down or is reset in operation 307.

If the error correction circuit 103/203 determines that the error in the information is correctable in operation 303, then error correction circuit 103/203 corrects the error in the information using the error bits received from memory circuit 102/202 to generate corrected information in operation 304. In the example of FIG. 1, error correction circuit 103 corrects the error in the data read from memory circuit 102 to generate corrected data, and error correction circuit 103 provides the corrected data to a second data input of multiplexer circuit 104 in the read/write circuit 101 in operation 304. In addition, error correction circuit 103 generates a value in the Error signals in operation 304 that indicate that an error has been detected and corrected in the data read from memory circuit 102 and that the read data output of error correction circuit 103 is corrected data. The Error signals are provided to select inputs of multiplexer circuit 104.

In the example of FIG. 2, error correction circuit 203 corrects the error in the instruction read from memory circuit 202 to generate a corrected instruction, and error correction circuit 203 provides the corrected instruction to the instruction read/write circuit 201 in operation 304. In addition, error correction circuit 203 generates a value in the Error signals in operation 304 that indicate that an error has been detected and corrected in the instruction read from memory circuit 202 and that the read instruction output of error correction circuit 203 has been corrected.

In operation 305, the read/write circuit 101/201 causes the corrected information received from the error correction circuit 103/203 to be written back to memory circuit 102/202 to overwrite the corrupted information read from memory circuit 102/202 in operation 301. In the example of FIG. 1, multiplexer circuit 104 determines if the Error signals indicate a correctable error, and simultaneously if there is a command (e.g., read/write command) from processor circuit 100. The multiplexer circuit 104 prioritizes overwriting corrupted data stored in memory circuit 102 over read/write commands from processor circuit 100. Multiplexer circuit 104 provides the corrected data received from the error correction circuit 103 from its second data input to memory circuit 102 as write data in operation 305 in response to the Error signals indicating that an error has been detected and corrected in the data read from memory circuit 102. The error correction circuit 103 may also provide a write command and one or more write addresses to the second data input of multiplexer 104. The write addresses indicate the locations of the memory cells that the read data were accessed from in memory circuit 102 in operation 301. Multiplexer circuit 104 provides the write command and the write addresses to memory circuit 102 in response to the Error signals indicating that an error has been detected and corrected in the data read from memory circuit 102. In response to the write command and write addresses received from multiplexer circuit 104, memory circuit 102 stores the corrected data received from multiplexer circuit 104 in the same memory cells having the write addresses that the read data were accessed from in operation 301. The memory circuit 102 causes the corrected data to overwrite the corrupted data accessed from memory circuit 102 in operation 301.

In FIG. 2, instruction read/write circuit 201 provides the corrected instruction received from error correction circuit 203 to memory circuit 202 in operation 305. Also, in operation 305, instruction read/write circuit 201 provides the Error signals to memory circuit 202 as a write command. The Error signals may also indicate one or more write addresses. In response to the write command received from instruction read/write circuit 201, memory circuit 202 stores the corrected instruction in the memory cells indicated by the same write addresses that the read instruction was accessed from in operation 301. The memory circuit 202 causes the corrected instruction to overwrite the corrupted instruction accessed from memory circuit 202 in operation 301.

The read/write circuit 101/201 may send the write command to memory circuit 102/202 asynchronously in operation 305, such that the write command is not associated with any instruction being executed by processor circuit 100. The write command may be transparent to the flow of a program being executed by the processor circuit 100. Control logic in the processor circuit 100 does not raise an exception when the error correction circuit 103/203 generates a value in the Error signals indicating a correctable error in the information read from memory circuit 102/202. The exception handler in the processor circuit 100 is not invoked, and the flow of the program being executed by the processor circuit 100 is not disrupted by any errors in information read from memory circuit 102/202.

In an exemplary implementation, the error correction circuit 103/203 stalls the state of the processor circuit 100 for a short time, e.g. for one cycle, to allow time for the corrected information to be written back to the memory circuit 102/202 in operation 305. The processor circuit 100 may, for example, stall its state in response to the Error signals indicating a correctable error in the information. The processor circuit 100 may temporarily stop the execution of a program or software instructions without having to save states or change the flow of the program or software instructions, because the state of the processor circuit 100 is only stalled for a short period of time to allow for the corrected information to be written back to the memory circuit 102/202.

After operation 305, processor circuit 100 may issue additional read commands in operation 301 to access additional data and instructions stored in memory circuits 102 and 202, respectively. An additional iteration of operations 302-307 may then be performed as described above. Also, after operation 305, the corrected information is provided from error correction circuit 103/203 to pipeline circuitry in processor circuit 100 in operation 306 in response to the read command issued by processor circuit 100 in operation 301.

Figure 4:
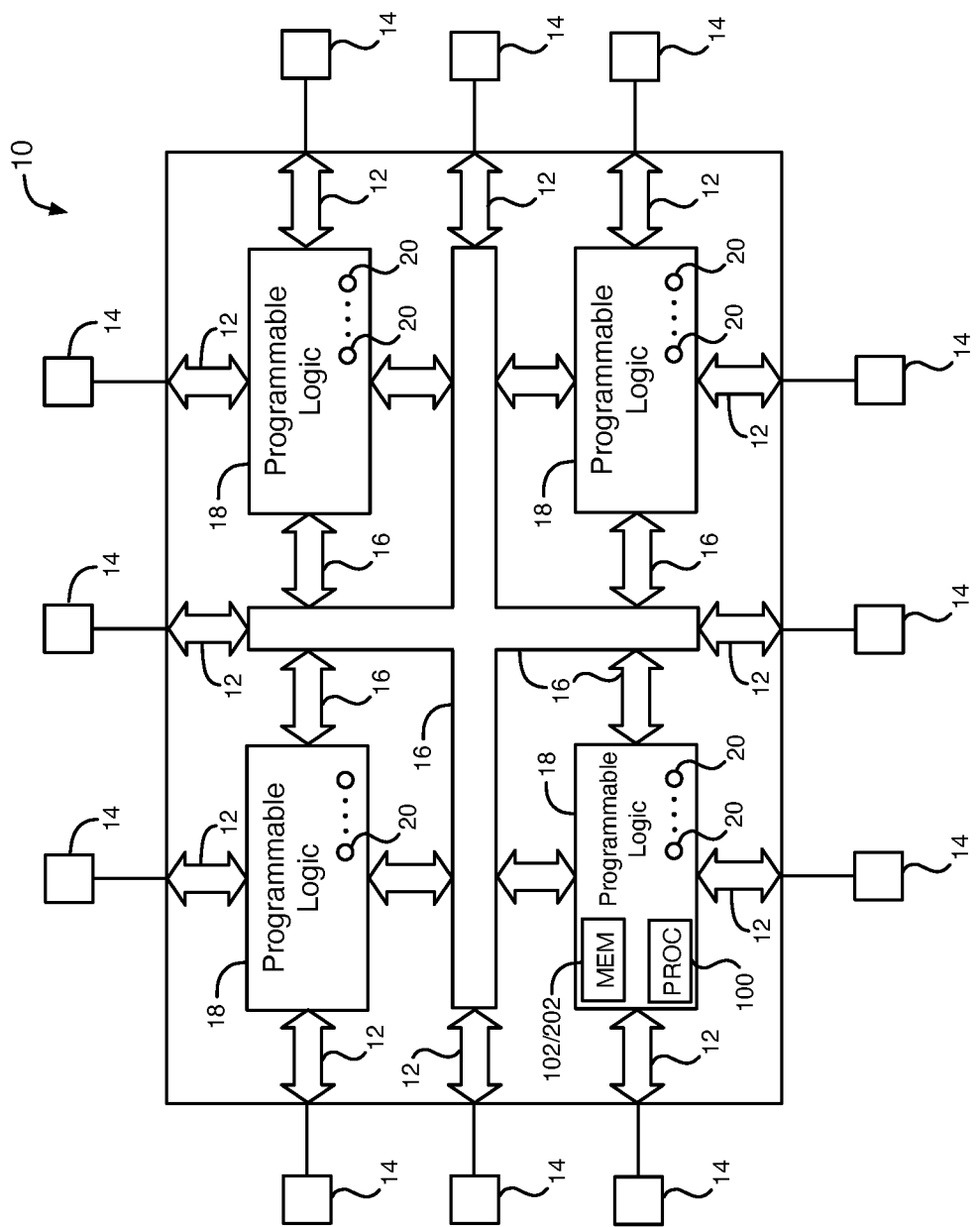
FIG. 4 is a diagram of an exemplary programmable logic integrated circuit (IC) that includes one or more processor circuits and one or more memory circuits.

An illustrative programmable logic integrated circuit (IC) 10 that includes one or more processor circuits 100 and one or more memory circuits 102/202 is shown in FIG. 4. IC 10 includes 4 regions 18 of programmable logic circuits. In the example of FIG. 4, the region 18 in the lower left corner includes a processor circuit 100 and a memory circuit 102 or 202. Although one processor circuit (PROC) 100 and one memory (MEM) circuit 102/202 is shown in FIG. 4 as an example, IC 10 may have any suitable number of processor circuits 100 and memory circuits 102/202.

As shown in FIG. 4, programmable logic integrated circuit 10 may have input-output circuitry 12 for driving signals off of IC 10 and for receiving signals from other devices via input-output pads 14. Processor circuit 100 may use input-output circuitry 12 and input-output pads 14 to provide data to external devices. Interconnection resources 16 such as global, regional, and local vertical and horizontal conductive lines and buses may be used to route signals on IC 10. Interconnection resources 16 include fixed interconnects (conductive lines) and programmable interconnects (i.e., programmable connections between respective fixed interconnects). The programmable logic circuitry in regions 18 may include combinational and sequential logic circuitry. The programmable logic circuitry in regions 18 may be configured to perform custom logic functions according to a custom design for IC 10.

Programmable logic IC 10 contains memory elements 20 that can be loaded with configuration data (also called programming data) using pads 14 and input-output circuitry 12. Once loaded, the memory elements 20 may each provide a corresponding static control output signal that controls the state of an associated logic component in the programmable logic circuitry in one of regions 18. Typically, the memory element output signals are used to control the gates of metal-oxide-semiconductor (MOS) transistors. In the context of programmable logic integrated circuits, memory elements 20 store configuration data and are sometimes referred to as configuration random-access memory (CRAM) cells.

In general, software and data for performing any of the functions disclosed herein (e.g., by processor circuit 100) may be stored in non-transitory computer readable storage media. Non-transitory computer readable storage media is tangible computer readable storage media that stores data for a significant period of time, as opposed to media that only transmits propagating electrical signals (e.g., wires). The software code may sometimes be referred to as software, data, program instructions, instructions, or code. The non-transitory computer readable storage media may include computer memory chips, non-volatile memory such as non-volatile random-access memory (NVRAM), one or more hard drives (e.g., magnetic drives or solid state drives), one or more removable flash drives or other removable media, compact discs (CDs), digital versatile discs (DVDs), Blu-ray discs (BDs), other optical media, and floppy diskettes, tapes, or any other suitable memory or storage device(s).

Additional examples are provided below. Example 1 is an integrated circuit comprising: a read and write circuit; a memory circuit; and an error correction circuit that receives information read from the memory circuit, wherein the error correction circuit generates an error signal indicating if the information contains an error, wherein the error correction circuit corrects the error in the information to generate corrected information and provides the corrected information to the read and write circuit, and wherein the read and write circuit causes the memory circuit to overwrite the information stored in the memory circuit with the corrected information in response to the error signal.

In Example 2, the integrated circuit of Example 1 may optionally include, wherein the read and write circuit comprises a multiplexer circuit that provides the corrected information to the memory circuit to overwrite the information stored in the memory circuit in response to the error signal indicating that the information contains a correctable error.

In Example 3, the integrated circuit of any one of Examples 1 or 2 may optionally include, wherein the read and write circuit is part of a processor circuit that temporarily stalls execution of a program without having to save states of the processor circuit while the corrected information is stored in the memory circuit.

In Example 4, the integrated circuit of any one of Examples 1-3 may optionally include, wherein the read and write circuit provides a write command to the memory circuit in response to the error signal indicating that the information contains a correctable error, and wherein the memory circuit overwrites the information stored in the memory circuit with the corrected information in response to the write command from the read and write circuit.

In Example 5, the integrated circuit of any one of Examples 1-4 may optionally include, wherein the information read from the memory circuit is data, and wherein the corrected information generated by the error correction circuit is corrected data.

In Example 6, the integrated circuit of Example 1 may optionally include, wherein the read and write circuit provides the error signal to the memory circuit, and wherein the memory circuit stores the corrected information in the memory circuit in response to the error signal indicating that the information contains a correctable error.

In Example 7, the integrated circuit of any one of Examples 1-4 or 6 may optionally include, wherein the information read from the memory circuit is an instruction, and wherein the corrected information generated by the error correction circuit is a corrected instruction.

In Example 8, the integrated circuit of any one of Examples 1-7 may optionally include, wherein the error correction circuit determines if the error in the information read from the memory circuit is correctable, and wherein the error correction circuit causes a processor circuit to shut down or reset in response to the error correction circuit detecting that the error is uncorrectable.

In Example 9, the integrated circuit of any one of Examples 1-8 may optionally include, wherein the integrated circuit is a programmable integrated circuit, and wherein the read and write circuit and the error correction circuit are implemented by programmable logic circuits.

In Example 10, the integrated circuit of any one of Examples 1-9 may optionally include, wherein the error correction circuit generates multiple error signals indicating whether the information read from the memory circuit contains the error and whether the error is correctable or uncorrectable.

Example 11 is a method for overwriting information stored in a memory circuit, the method comprising: receiving the information read from the memory circuit at an error correction circuit; generating an error signal indicating if the error correction circuit has detected an error in the information; correcting the error in the information using the error correction circuit to generate corrected information if the error is a correctable error; providing the corrected information and the error signal to a processor circuit; providing the corrected information and a write command to the memory circuit when the error signal indicates the error using the processor circuit; and overwriting the information stored in the memory circuit with the corrected information in response to the write command.

In Example 12, the method of Example 11 may optionally include, wherein providing the corrected information and the write command to the memory circuit further comprises providing the corrected information to the memory circuit using a multiplexer circuit in response to the error signal indicating that the information contains the correctable error.

In Example 13, the method of Example 11 may optionally include, wherein providing the corrected information and the write command to the memory circuit further comprises providing the error signal to the memory circuit using the processor circuit, and wherein overwriting the information stored in the memory circuit with the corrected information further comprises storing the corrected information in the memory circuit in response to the error signal indicating that the information contains the correctable error.

In Example 14, the method of any one of Examples 11-13 may optionally further comprise: stalling execution of a program running in the processor circuit without having to save states of the processor circuit while overwriting the information stored in the memory circuit with the corrected information.

In Example 15, the method of any one of Examples 11-14 may optionally include, wherein generating the error signal indicating if the error correction circuit has detected the error in the information further comprises determining if the error in the information read from the memory circuit is uncorrectable, and wherein the method further comprises:

causing the processor circuit to shut down or reset in response to the error correction circuit detecting that the error is uncorrectable.

In Example 16, the method of Example 12 may optionally include, wherein providing the corrected information to the memory circuit using the multiplexer circuit further comprises: prioritizing providing the corrected information to the memory circuit over an additional command from the processor circuit using the multiplexer circuit.

Example 17 is an electronic system comprising: a processor circuit; a memory circuit; and an error correction circuit that receives information read from the memory circuit, wherein the error correction circuit detects if the information contains an error, wherein the error correction circuit corrects the error in the information to generate corrected information and provides the corrected information and an error signal to the processor circuit, wherein the processor circuit provides the corrected information and a write command to the memory circuit based on the error signal indicating the error; and wherein the memory circuit overwrites the information stored in the memory circuit with the corrected information in response to the write command.

In Example 18, the electronic system of Example 17 may optionally include, wherein the processor circuit comprises a multiplexer circuit that provides the corrected information to the memory circuit to overwrite the information stored in the memory circuit in response to the error signal indicating that the information contains a correctable error, and wherein the multiplexer circuit prioritizes providing the corrected information to the memory circuit over an additional command from the processor circuit.

In Example 19, the electronic system of Example 17 may optionally include, wherein the processor circuit provides the error signal to the memory circuit, and wherein the memory circuit stores the corrected information in the memory circuit in response to the error signal provided from the processor circuit indicating that the information contains a correctable error.

In Example 20, the electronic system of any one of Examples 17-19 may optionally include, wherein the information is accessed from the memory circuit in response to a read command provided to the memory circuit from a read and write circuit in the processor circuit, and wherein the processor circuit temporarily stalls execution of a program without saving states of the processor circuit while the corrected information is stored in the memory circuit.

The foregoing description of the exemplary embodiments has been presented for the purpose of illustration. The foregoing description is not intended to be exhaustive or to be limiting to the examples disclosed herein. In some instances, various features can be employed without a corresponding use of other features as set forth. Many modifications, substitutions, and variations are possible in light of the above teachings, without departing from the scope of the present embodiments.

What is claimed is:

1. An integrated circuit comprising:
   a read and write circuit;
   a memory circuit; and
   an error correction circuit that:
      receives information read from the memory circuit,
      generates an error signal indicating if the information contains an error,
      determines whether the error in the information read from the memory circuit is correctable,
      in response to the determination that the error is uncorrectable:
         causes a processor circuit to shut down or reset, and
      in response to the determination that the error is correctable:
         corrects the error in the information to generate corrected information, and
         provides the corrected information to the read and write circuit, and
   wherein the read and write circuit causes the memory circuit to overwrite the information stored in the memory circuit with the corrected information in response to the error signal, wherein the processor circuit comprises the read and write circuit, and wherein the processor circuit temporarily stalls execution of a program without saving state information of the processor circuit while the corrected information is stored in the memory circuit.

2. The integrated circuit of claim 1, wherein the read and write circuit comprises a multiplexer circuit that provides the corrected information to the memory circuit to overwrite the information stored in the memory circuit in response to the error signal indicating that the information contains a correctable error.

3. The integrated circuit of claim 2, wherein the information read from the memory circuit is data, and wherein the corrected information generated by the error correction circuit is corrected data.

4. The integrated circuit of claim 1, wherein the read and write circuit provides a write command to the memory circuit in response to the error signal indicating that the information contains a correctable error, and wherein the memory circuit overwrites the information stored in the memory circuit with the corrected information in response to the write command from the read and write circuit.

5. The integrated circuit of claim 1, wherein the read and write circuit provides the error signal to the memory circuit, and wherein the memory circuit stores the corrected information in the memory circuit in response to the error signal indicating that the information contains a correctable error.

6. The integrated circuit of claim 5, wherein the information read from the memory circuit is an instruction, and wherein the corrected information generated by the error correction circuit is a corrected instruction.

7. The integrated circuit of claim 1, wherein the integrated circuit is a programmable integrated circuit, and wherein the read and write circuit and the error correction circuit are implemented by programmable logic circuits.

8. The integrated circuit of claim 1, wherein the error correction circuit generates multiple error signals indicating whether the information read from the memory circuit contains the error and whether the error is correctable or uncorrectable.

9. A method for overwriting information stored in a memory circuit, the method comprising:
   receiving the information read from the memory circuit at an error correction circuit;
   generating an error signal indicating if the error correction circuit has detected an error in the information;
   determining whether the error in the information is correctable;
   in response to determining that the error is uncorrectable:
      causing a processor circuit to shut down or reset; and
   in response to determining that the error is correctable:
      correcting the error in the information using the error correction circuit to generate corrected information if the error is a correctable error;
      providing the corrected information and the error signal to the processor circuit;

providing the corrected information and a write command to the memory circuit when the error signal indicates the error using the processor circuit;

temporarily stalling execution of a program running in the processor circuit without saving states of the processor circuit; and while execution of the program is temporarily stalled, overwriting the information stored in the memory circuit with the corrected information in response to the write command.

10. The method of claim 9, wherein providing the corrected information and the write command to the memory circuit further comprises providing the corrected information to the memory circuit using a multiplexer circuit in response to the error signal indicating that the information contains the correctable error.

11. The method of claim 10, wherein providing the corrected information to the memory circuit using the multiplexer circuit further comprises:

prioritizing providing the corrected information to the memory circuit over an additional command from the processor circuit using the multiplexer circuit.

12. The method of claim 9, wherein providing the corrected information and the write command to the memory circuit further comprises providing the error signal to the memory circuit using the processor circuit, and wherein overwriting the information stored in the memory circuit with the corrected information further comprises storing the corrected information in the memory circuit in response to the error signal indicating that the information contains the correctable error.

13. An electronic system comprising:
a processor circuit;
a memory circuit; and
an error correction circuit that:
receives information read from the memory circuit,
detects whether the information contains an error,
determines whether the error in the information read from the memory circuit is correctable,
in response to the determination that the error is uncorrectable:

causes the processor circuit to shut down or reset; and in response to the determination that the error is correctable:

corrects the error in the information to generate corrected information, and provides the corrected information and an error signal to the processor circuit, and wherein:

the processor circuit provides the corrected information and a write command to the memory circuit based on the error signal indicating the error;

the processor circuit temporarily stalls execution of a program without saving states of the processor circuit; and while execution of the program is temporarily stalled, the memory circuit overwrites the information stored in the memory circuit with the corrected information in response to the write command.

14. The electronic system of claim 13, wherein the processor circuit comprises a multiplexer circuit that provides the corrected information to the memory circuit to overwrite the information stored in the memory circuit in response to the error signal indicating that the information contains a correctable error, and wherein the multiplexer circuit prioritizes providing the corrected information to the memory circuit over an additional command from the processor circuit.

15. The electronic system of claim 13, wherein the processor circuit provides the error signal to the memory circuit, and wherein the memory circuit stores the corrected information in the memory circuit in response to the error signal provided from the processor circuit indicating that the information contains a correctable error.

16. The electronic system of claim 13, wherein the information is accessed from the memory circuit in response to a read command provided to the memory circuit from a read and write circuit in the processor circuit.

* * * * *